US008640021B2

(12) United States Patent
Perez et al.

(10) Patent No.: US 8,640,021 B2
(45) Date of Patent: Jan. 28, 2014

(54) AUDIENCE-BASED PRESENTATION AND CUSTOMIZATION OF CONTENT

(75) Inventors: Kathryn Stone Perez, Kirkland, WA (US); Andrew Fuller, Redmond, WA (US); Avi Bar-Zeev, Redmond, WA (US); Sheridan Martin Small, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 152 days.

(21) Appl. No.: 12/945,664

(22) Filed: Nov. 12, 2010

(65) Prior Publication Data

US 2012/0124456 A1    May 17, 2012

(51) Int. Cl.
*G06F 17/00* (2006.01)

(52) U.S. Cl.
USPC .......................................................... 715/203

(58) Field of Classification Search
USPC .................................. 715/201, 203, 204, 243
See application file for complete search history.

(56) References Cited

U.S. PATENT DOCUMENTS

| 6,014,638 | A | 1/2000 | Burge et al. | |
| 6,144,938 | A * | 11/2000 | Surace et al. | 704/257 |
| 6,585,521 | B1 | 7/2003 | Obrador | |
| 7,003,139 | B2 | 2/2006 | Endrikhovski et al. | |
| 7,512,889 | B2 | 3/2009 | Newell et al. | |
| 7,937,450 | B2 * | 5/2011 | Janik | 709/217 |
| 2001/0041053 | A1 * | 11/2001 | Abecassis | 386/83 |
| 2002/0054174 | A1 * | 5/2002 | Abbott et al. | 345/863 |
| 2002/0062481 | A1 | 5/2002 | Slaney et al. | |
| 2002/0191775 | A1 * | 12/2002 | Boies et al. | 379/266.01 |
| 2002/0194379 | A1 * | 12/2002 | Bennett et al. | 709/246 |
| 2003/0179229 | A1 * | 9/2003 | Van Erlach et al. | 345/744 |
| 2003/0237093 | A1 | 12/2003 | Marsh | |
| 2004/0117735 | A1 * | 6/2004 | Breen | 715/517 |
| 2004/0139482 | A1 * | 7/2004 | Hale et al. | 725/135 |
| 2004/0260767 | A1 * | 12/2004 | Kedem et al. | 709/203 |

(Continued)

FOREIGN PATENT DOCUMENTS

| JP | 2008204193 | 9/2008 |
| KR | 1020020070490 | 9/2002 |
| KR | 1020080057705 | 6/2008 |

OTHER PUBLICATIONS

Andre, Elisabeth, et al, "From Adaptive Hypertext to Personalized Web Companions", Communications of the ACM, vol. 45, Issue 5, May 2002, pp. 43-46.*

(Continued)

*Primary Examiner* — Laurie Ries
(74) *Attorney, Agent, or Firm* — Vierra Magen Marcus LLP

(57) ABSTRACT

A system and method are disclosed for delivering content customized to the specific user or users interacting with the system. The system includes one or more modules for recognizing an identity of a user. These modules may include for example a gesture recognition engine, a facial recognition engine, a body language recognition engine and a voice recognition engine. The user may also be carrying a mobile device such as a smart phone which identifies the user. One or more of these modules may cooperate to identify a user, and then customize the user's content based on the user's identity. In particular, the system receives user preferences indicating the content a user wishes to receive and the conditions under which it is to be received. Based on the user preferences and recognition of a user identity and/or other traits, the system presents content customized for a particular user.

20 Claims, 11 Drawing Sheets

(56) References Cited

U.S. PATENT DOCUMENTS

| | | | |
|---|---|---|---|
| 2005/0132420 A1 | 6/2005 | Howard et al. | |
| 2005/0223237 A1 | 10/2005 | Barletta et al. | |
| 2005/0288954 A1* | 12/2005 | McCarthy et al. | 705/1 |
| 2007/0167689 A1 | 7/2007 | Ramadas et al. | |
| 2008/0235586 A1* | 9/2008 | Chou et al. | 715/717 |
| 2009/0083788 A1* | 3/2009 | Russell et al. | 725/34 |
| 2009/0135176 A1* | 5/2009 | Snoddy et al. | 345/419 |
| 2009/0138805 A1* | 5/2009 | Hildreth | 715/745 |
| 2009/0217211 A1* | 8/2009 | Hildreth et al. | 715/863 |
| 2009/0234815 A1* | 9/2009 | Boerries et al. | 707/3 |
| 2010/0031162 A1* | 2/2010 | Wiser et al. | 715/747 |
| 2010/0042911 A1* | 2/2010 | Wormald et al. | 715/205 |
| 2010/0218087 A1* | 8/2010 | Knobel | 715/236 |
| 2010/0306249 A1* | 12/2010 | Hill et al. | 707/769 |
| 2010/0306368 A1* | 12/2010 | Gagliardi et al. | 709/224 |
| 2011/0041077 A1* | 2/2011 | Reiner | 715/745 |
| 2011/0107265 A1* | 5/2011 | Buchanan et al. | 715/835 |
| 2011/0112826 A1* | 5/2011 | Wang et al. | 704/9 |
| 2011/0302497 A1* | 12/2011 | Garrett et al. | 715/736 |
| 2012/0011544 A1* | 1/2012 | Vaysman et al. | 725/38 |
| 2012/0072936 A1* | 3/2012 | Small et al. | 725/10 |

OTHER PUBLICATIONS

Kalyanaraman, S., "The Psychological Appeal of Personalized Web Content in Web Portals: Does Customization Affect Attitudes and Behavior?", Journal of Communication, ISSN 0021-9916, 2006, pp. 110-132.*

Seles, Sheila Murphy, "Audience Research for Fun and Profit: Rediscovering the Value of Television Audiences", Masters Thesis, May 7, 2010, pp. 1-128, Boston, MA, Massachusetts Institute of Technology.

International Search Report and Written Opinion dated May 29, 2012 in International Patent Application No. PCT/US2011/058973.

English Abstract for KR1020020070490 dated Sep. 9, 2002.

English Abstract for KR1020080057705 dated Jun. 25, 2008.

English Abstract for JP2008204193 dated Sep. 4, 2008.

* cited by examiner

AUDIENCE-BASED PRESENTATION AND CUSTOMIZATION OF CONTENT

BACKGROUND

Content-delivery devices such as televisions and other monitors do not customize delivered content based on which users are receiving the content. For example, television broadcasts provide the same content regardless of the specific audience members. While Internet television allows a degree of customization, it is the user, and not the device, that is making selections of content. And if it is done by the device, it is done by an identification of the device, without knowing who is on the receiving end of the content. Discrete content-delivery devices are presently evolving into a single collaborative system. However, there remains a need for such a collaborative system to recognize users and user traits, and to adjust the content delivered, as well as how it is delivered, based on this recognition.

SUMMARY

The present technology, roughly described, relates to a system capable of identifying a user or users, and delivering content customized to those specific user or users. The system receives user preferences indicating the content a user wishes to receive, as well as possibly how and when the user would like to receive the content. In embodiments, the system may also receive user preferences as to what content the user wishes to receive when they are in a particular mood or emotional state. The system is further able to recognize an identity and other traits of one or more users, including for example an emotional state of a user and how attentive a user is to presented content. Based on the user preferences and recognition of a user identity and/or other traits, the system presents content customized for a particular user.

In one example, the present technology relates to a method for customizing content for presentation to a user via one or more computing devices. The method includes the steps of (a) identifying at least one of: (a1) one or more users within perception range of a computing device of the one or more computing devices, and (a2) an emotional state or mood of one or more users within perception range of a computing device of the one or more computing devices; and (b) providing content to the user via the one or more computing devices based on an identity of the one or more users and/or emotional state or mood of the one or more users of said step (a).

In a further embodiment, the present technology relates to a method of customizing content for presentation to a user via one or more computing devices. The method includes the steps of: (a) detecting at least one of user identity and a user mood or emotion via at least one of a gesture recognition engine, a facial recognition engine, a body language recognition engine and a voice recognition engine; (b) receiving user preferences as to the type of content a user wishes to receive, and user preferences as to how and when a user wishes to receive specified content; and (c) presenting content to the user based on said steps (a) and (b).

Another example of the present technology relates to a computer-readable medium for programming a processor to perform the steps of: (a) identifying at least one of: (a1) one or more users within perception range of a computing device of the one or more computing devices; and (a2) an emotional state or mood of one or more users within perception range of a computing device of the one or more computing devices; (b) receiving user preferences of a user of the one or more users, the user preferences specifying one or more of: (b1) the type of content the user wishes to receive; (b2) times at which the user wishes to receive the content specified in step (b1); (b3) the computing devices on which the user wishes to receive the content specified in said step (b1); (b4) how the content presented to the user is to change when the user is not alone; and (b5) a priority order of how the user preferences set forth in (b1) to (b4) are to be applied; and (c) customizing content presented to the user based on said steps (a) and (b).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Figure 1:
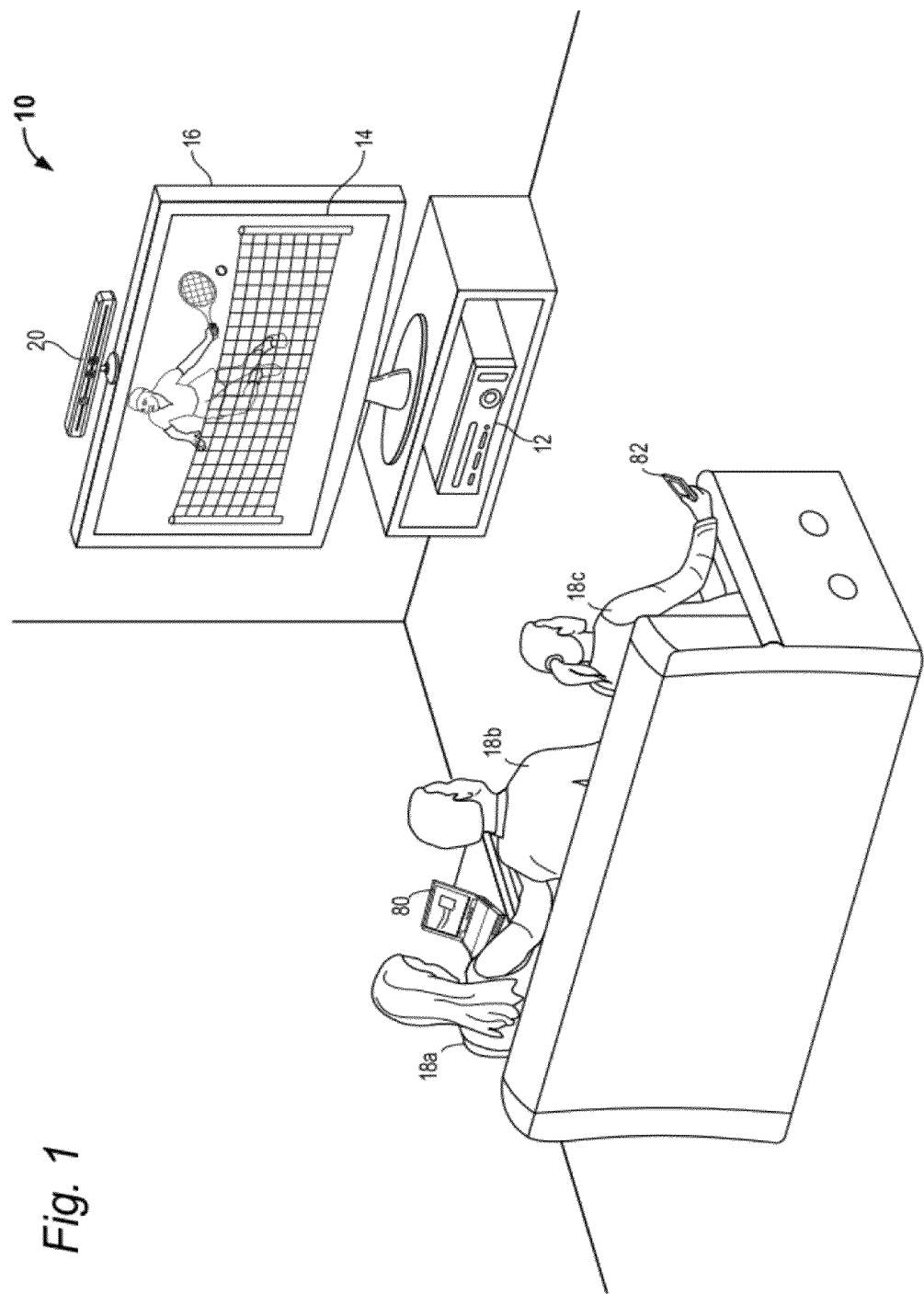
FIG. 1 illustrates an example embodiment of a target recognition, analysis, and tracking system.

Embodiments of the present technology will now be described with reference to FIGS. 1-7B, which in general relate to a content-delivery system capable of recognizing identity and other traits of one or more users, and customizing the content delivered based on the recognized identity and/or traits. The system includes a variety of computing devices which may be paired or otherwise communicatively coupled so as to be able to exchange information and hand-off content. The computing devices further include detection systems for detecting user identity and, in embodiments, traits of the user. These traits may include for example a user's mood, emotional state and degree of attentiveness to content being delivered to the user via his or her devices. The system further includes user profiles including a wide array of defined user preferences. The user preferences set forth the content a user would like to receive from his or her devices, and how, when and under what conditions that content is to be delivered to the user.

Such a system is able to identify a user within range of one or more of the computing devices, and automatically offer content to the user that is customized for that user. In embodiments, the offered content may further be customized based on the user's mood and emotional state. Where more than one user is within range of one or more of the computing devices, the system may search for shared content preferences between the users and identify content which all of the users may enjoy together. The system further allows users to specify where their content is to be presented. For example, a user may wish to display his or her content on a public display when they are alone, but have that content moved to a more personal display when others are present.

These and other aspects of the present technology will now be explained in greater detail with respect to the collaborative environment 5 shown in FIG. 1. The collaborative environment 5 includes a target recognition, analysis, and tracking system 10 which may be used to recognize, analyze, and/or track human targets such as the users 18. Embodiments of the target recognition, analysis, and tracking system 10 include a computing device 12 for presenting content and/or executing a gaming or other application. In one embodiment, computing device 12 may include a processor such as a standardized processor, a specialized processor, a microprocessor, or the like that may execute instructions stored on a processor readable storage device for performing processes described herein.

The system 10 further includes a capture device 20 for capturing image and audio data relating to one or more users and/or objects sensed by the capture device. In embodiments, the capture device 20 may be used to capture information relating to movements, gestures and speech of one or more users 18, which information may be received by the computing device 12 and used to identify users and user traits as explained below. FIG. 1 shows an embodiment including three users 18, which may for example be a mother 18a, a father 18b and a daughter 18c. The use of a three family members is for illustrative purposes only. There may be one or more users 18 in environment 5, and the users may have any of a variety of relation to each other.

Embodiments of the target recognition, analysis and tracking system 10 may be connected to an audio/visual device 16 having a display 14. In the example of FIG. 1, the display 14 is presenting content to the users 18. The device 16 may for example be a television, a monitor, a high-definition television (HDTV), or the like that may provide content, game or application visuals and/or audio to a user. For example, the computing device 12 may include a video adapter such as a graphics card and/or an audio adapter such as a sound card that may provide audio/visual signals associated with the game or other application. The audio/visual device 16 may receive the audio/visual signals from the computing device 12 and may then output the content, game or application visuals and/or audio associated with the audio/visual signals to the user 18. According to one embodiment, the audio/visual device 16 may be connected to the computing device 12 via, for example, an S-Video cable, a coaxial cable, an HDMI cable, a DVI cable, a VGA cable, a component video cable, or the like.

Suitable examples of a system 10 and components thereof are found in the following co-pending patent applications, all of which are hereby specifically incorporated by reference: U.S. patent application Ser. No. 12/475,094, entitled "Environment and/or Target Segmentation," filed May 29, 2009; U.S. patent application Ser. No. 12/511,850, entitled "Auto Generating a Visual Representation," filed Jul. 29, 2009; U.S. patent application Ser. No. 12/474,655, entitled "Gesture Tool," filed May 29, 2009; U.S. patent application Ser. No. 12/603,437, entitled "Pose Tracking Pipeline," filed Oct. 21, 2009; U.S. patent application Ser. No. 12/475,308, entitled "Device for Identifying and Tracking Multiple Humans Over Time," filed May 29, 2009, U.S. patent application Ser. No. 12/575,388, entitled "Human Tracking System," filed Oct. 7, 2009; U.S. patent application Ser. No. 12/422,661, entitled "Gesture Recognizer System Architecture," filed Apr. 13, 2009; U.S. patent application Ser. No. 12/391,150, entitled "Standard Gestures," filed Feb. 23, 2009; and U.S. patent application Ser. No. 12/474,655, entitled "Gesture Tool," filed May 29, 2009.

Figure 2:
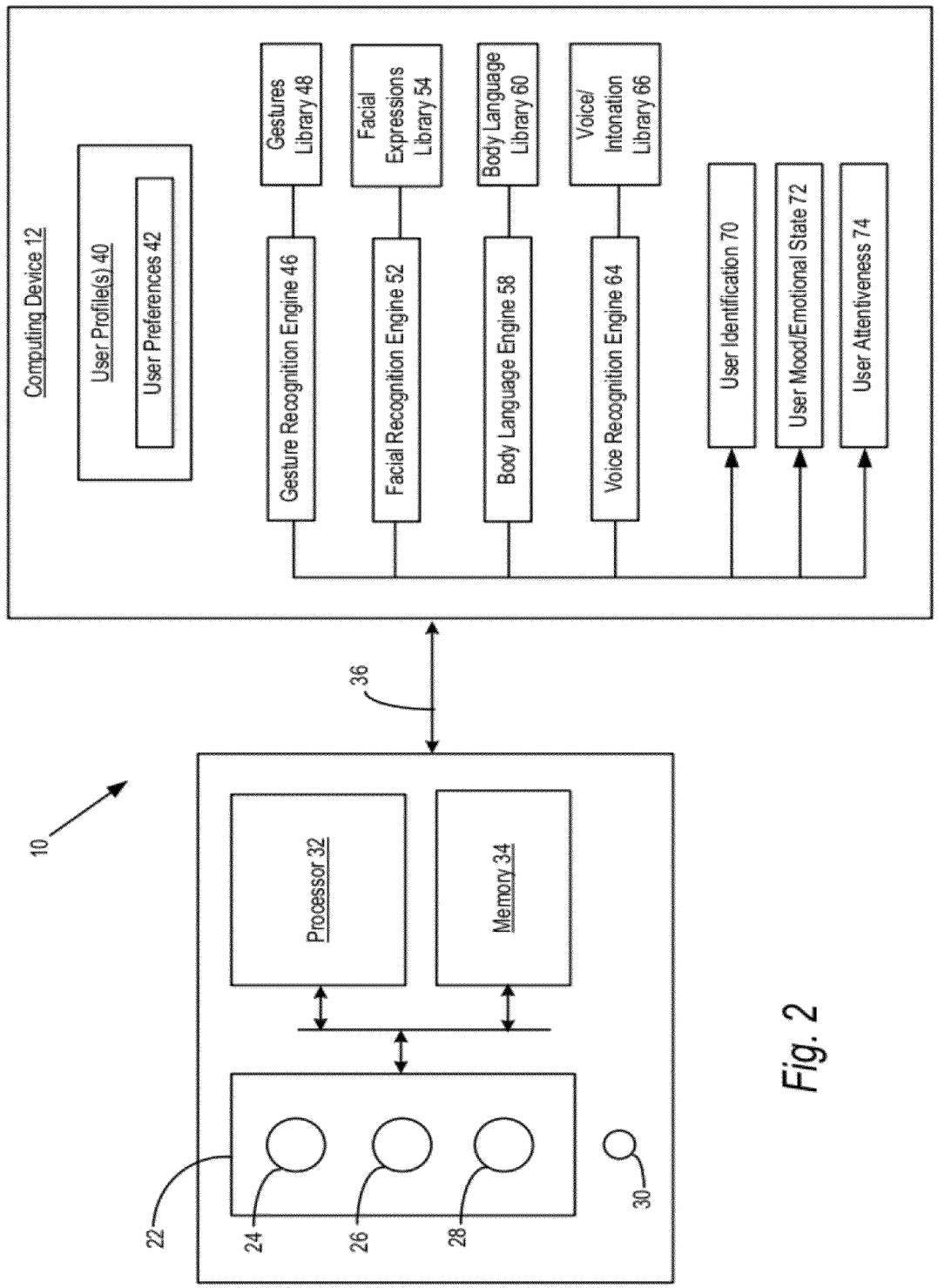
FIG. 2 illustrates an example embodiment of a capture device that may be used in a target recognition, analysis, and tracking system.
Figure 3:
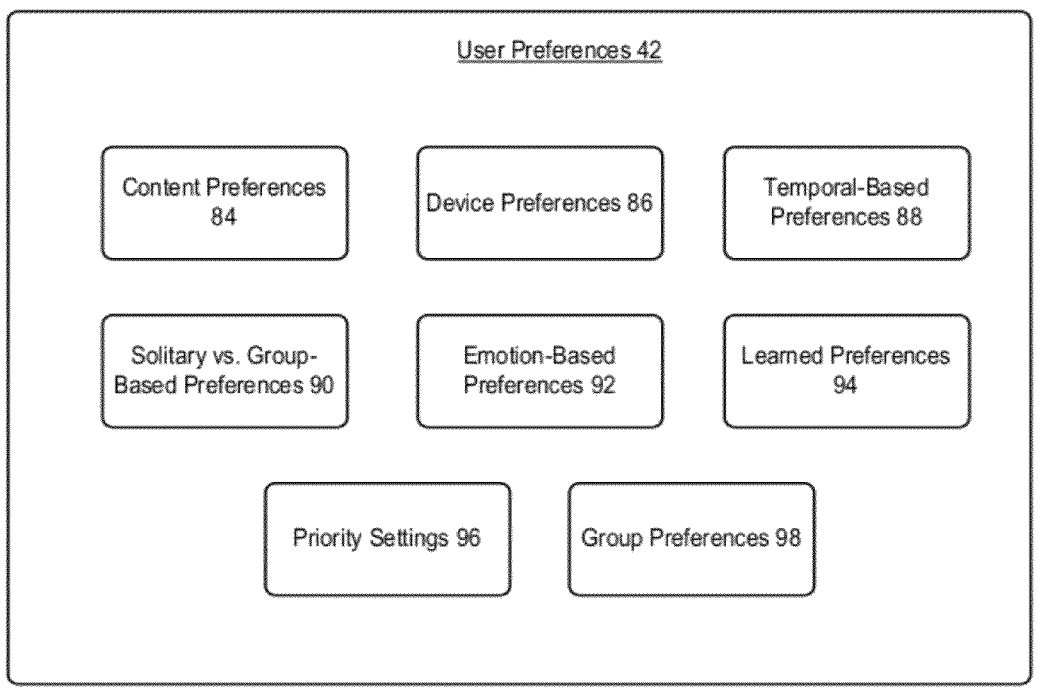
FIG. 3 is a block diagram of a user profile according to an embodiment of the present system.

FIG. 2 illustrates an example embodiment of the capture device 20 that may be used in the target recognition, analysis, and tracking system 10. In an example embodiment, the capture device 20 may be configured to capture video having a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28.

In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 20 to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as a grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 20 to a particular location on the targets or objects.

According to another embodiment, the capture device 20 may include two or more physically separated cameras that may view a scene from different angles, to obtain visual stereo data that may be resolved to generate depth information. In another example embodiment, the capture device 20 may use point cloud data and target digitization techniques to detect features of the user.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing device 12 in the target recognition, analysis, and tracking system 10. Additionally, the microphone 30 may be used to receive audio signals that may also be provided by the user to control applications such as game applications, non-game applications, or the like that may be executed by the computing device 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image camera component 22 and the processor 32. According to another embodiment, the memory component 34 may be integrated into the processor 32 and/or the image camera component 22.

As shown in FIG. 2, the capture device 20 may be in communication with the computing device 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing device 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing device 12 via the communication link 36. A variety of known techniques exist for determining whether a target or object detected by capture device 20 corresponds to a human target. Skeletal mapping techniques may then be used to determine various spots on that user's skeleton, joints of the hands, wrists, elbows, knees, nose, ankles, shoulders, and where the pelvis meets the spine. One example of a skeletal tracking pipeline which may be used to track users within a scene is disclosed in U.S. patent application Ser. No. 12/876,418, entitled "System For Fast, Probabilistic Skeletal Tracking," filed Sep. 7, 2010, which application is incorporated herein by reference in its entirety. Other techniques include transforming the image into a body model representation of the person and transforming the image into a mesh model representation of the person. It is understood that other technologies may be used to identify a user, or all users, interacting with a system. Such additional technologies may identify users for example by thermal, audio, or RFID identification (in device or clothing or person). These and other additional identification technologies may be used in the present system.

FIG. 2 further shows user profile(s) 40, explained below, and a number of software engines used to recognize users and user traits such as mood, emotional state and attentiveness to the content he or she is receiving. In one embodiment, computing device 12 may include a gesture recognition engine 46 and a gestures library 48. Gestures library 48 includes a collection of gesture filters, each comprising information concerning a movement or gesture that may be performed by the user. In one embodiment, gesture recognition engine 46 may compare the skeletal model determined for a given frame or frames to the gesture filters in the gesture library 48 to identify when a user (as represented by the skeletal model) has performed one or more gestures. Computing device 12 may use the gestures library 48 to interpret movements of the skeletal model to perform one or more operations of the disclosed technology. More information about the gesture recognition engine 46 can be found in U.S. patent application Ser. No. 12/422,661, "Gesture Recognition System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009, both of which are incorporated by reference herein in their entirety.

In embodiments, the computing device 12 may further include a facial recognition engine 52. Facial recognition engine 52 may communicate with a facial expressions library 54. Facial expressions library 54 includes a collection of facial expression filters, each comprising information concerning a facial expression. In one example, the facial recognition engine 52 may compare the data captured by the 3-D depth camera 26 and/or RGB camera 28 in the capture device 20 to the facial expression filters in the facial expressions library 54 to identify a user's facial expression.

The facial recognition engine 52 and library 54 together may be used for at least three purposes. First, they may be used to identify one or more users within a field of view of the capture device(s) 20. Second, they may be used to determine a user mood or emotional state. For example, the library 54 may include stored facial filters for identifying when a user is crying, laughing, frowning, smiling, yawning, scowling, cringing, sleeping and a variety of other visual indicators associated with a particular mood/emotional state. Third, the facial recognition engine 52 and library 54 may be used to identify whether or not a user is paying attention to presented content. For example, as noted above, the library 54 may include stored facial features for identifying when a user is yawning, has his or her eyes closed and a variety of other visual cues indicative of whether a user is paying attention to presented content. These filters may be the same as or different than the above-described facial filters for determining mood/emotional state.

In embodiments, the computing device 12 may further include a body language engine 58. Body language engine 58 may communicate with a body language library 60, which includes a collection of body language filters relating to a user's body language. In one example, the body language engine 58 may compare the data captured by the capture device 20 to the body language filters in the library 60 to identify a user's body language.

The body language engine 58 and library 60 together may be used for at two purposes. First, they may be used to determine a user mood or emotional state. For example, the library 60 may include stored body language filters for identifying when a user is leaning forward, sitting up, slouching and a variety of other visual indicators of mood/emotional state. Second, the body language engine 58 and library 60 may be used to identify whether or not a user is paying attention to presented content. For example, the engine 58 may note whether the user is looking in the direction of presented content, or whether the user is looking away, restless or fidgety.

In embodiments, the computing device 12 may further include a voice recognition engine 64 communicating with a voice/intonation library 66. The voice/intonation library 66 may further include filters relating to specific types of voice intonations, inflections, and other vocal and non-vocal aural responses.

The voice recognition engine 64 and library 66 together may be used for at least three purposes. First, they may be used to identify one or more users within range of microphone 40. Known voice patterns for identified users may be stored in user profiles 40 or in the voice/intonation library 66. The stored voice patterns may be used by the voice recognition engine 64 for comparison against voice data received from the microphone 40 to match received voice data with stored known voices. Second, they may be used to determine a user mood or emotional state. For example, the library 66 may include stored voice filters for identifying when a user is crying, laughing, screaming, excited (as indicated by rapid speech, high volume and/or high pitch), sad (slower speech, lower volume and/or lower pitch) and a variety of other aural indicators which may be associated with a particular mood/emotional state. Library 66 may include filters for non-vocal sounds as well, such as for example clapping. Third, the voice recognition engine 64 and library 66 may be used to identify whether or not a user is paying attention to presented content. For example, is a user talking over presented content, or is a user singing, humming or clapping along with a sound track of presented content.

The filters for gestures library 48, facial expressions library 54, body language library 60, and voice/intonation library 66 may be developed from training data over a large segment of people. It is understood that the filters in the respective libraries may take into account cultural differences. For example, body movements may amount to a predefined gesture in one culture but not in another. With respect to detecting mood and emotional state, some cultures may be generally more animated, where others may be more stoic. The filters may thus be tuned for specific cultures and local customs.

It is also contemplated that libraries 48, 54, 60 and/or 66 may be trained with data from users of the system 10 so that the libraries are fine-tuned to the specific mannerisms of each particular user. Thus, over time, the libraries may for example learn that exhibited behavior from one user indicates a first mood or emotional state, where the same exhibited behavior from another user indicates a second, different mood or emotional state.

Using information from one or more of the above-described software engines and/or other sources, the present system may determine a user identity 70 of one or more users in a field of view of the capture device 20 and/or within range of microphone 40. For example, the capture device may capture physical features of a user (size, shape, hair type, etc.), and compare that data against data stored in user profiles 40 to determine a match. In embodiments, facial recognition engine 52 may also perform or aid in the identification of users in the field of view of the capture device 20. In one example, facial recognition engine 192 may correlate a user's face from a visual image received from the capture device 20 with a stored image of a user's facial features. In a further embodiment, the system may be able to identify or confirm a user from their voice pattern, based on comparison of a detected voice pattern to stored voice patterns for known users.

Other objective indicia may further be used instead of or in addition to the above-described engines to identify or confirm the identity of a user. For example, a user's identity may be determined by a user performing some identification act, such as entering a user ID and password. This information may be stored in user profiles 40 to allow authentication of entered information. With regard to further objective indicia, users may typically carry a cell phone or other mobile device (such as device 82, FIG. 1) having the user's identification. As explained below, when a user's mobile device is brought into communication range of computing device 12 of system 10, the computing devices may pair with each other and exchange information, such as the identity of the owner of the mobile device. There is no guarantee that the user in possession of the mobile device is the owner, but this is typically the case. At the least, the information received from a mobile device may be used to confirm an identity independently determined by other methods discussed above.

Using information from one or more of the above-described software engines and/or other sources, the present system may also determine a user's mood or emotional state 72. While mood and emotional state may be related, in general the two may be distinguished in that a mood may be a relatively long lasting emotional state. An emotional state may be transient, perhaps in response to received content, where a mood may generally be longer lasting. In further embodiments, mood and emotional state may be treated as being the same.

As discussed above, the facial recognition engine 52, the body language engine 58 and/or voice recognition engine 64 may all provide input allowing a determination of a user's mood/emotional state 72. In general, a user's mood/emotional state may have a wide variety of physical indicators, including for example body language, facial expression and/or vocal responses, which indicators may be sensed by one or more of the engines 52, 58 and/or 64. It is understood that the above described engines and libraries for detecting mood and/or emotion are by way of example only. Other detection devices and software modules may be used instead of or in addition to those described above for discerning mood and/or emotion. In further examples, devices may be provided for detecting biological vital signs (for example in a non-invasive manner), such as heart rate, breathing, body temperature, etc. Software engines may be provided for interpreting this information as a physiological indicator of mood/emotional state.

The mood/emotional state 72 may be one of a number of objectively defined categories, such as for example "happy," "sad," "mad," "excited," "scared" and "bored." Other classifications are possible. While subjective moods and emotions are not always susceptible to objective classification, to the extent a user is exhibiting physical characteristics of one of these classifications, this may be determined by the computing device 12 with the aid of the above-described facial, body language and/or voice recognition engines 52, 58, 64. In general, the engines 52, 58 and/or 64 may make determinations whether a user is exhibiting one or more traits indicative of a particular mood/emotion, and how strongly the one or more indicated traits match the corresponding filter in the libraries 54, 60 and 66. The strength with which a particular trait matches the model for that trait described in a library filter may result in a quantitative confidence value associated with the identified trait.

Using the output from the various engines 44, 52 and 58, and the confidence values of how strongly the measured trait matches the filter for a given trait, the computing device 12 may classify and quantify the mood/emotional state of a user in mood/emotional state 72. The computing device 12 may require a particular mood/emotion to be exhibited above some predetermined threshold value before that mood/emotion is set as mood/emotional state 72 for a user. Where no particular mood/emotion is shown, or where a mood/emotion is not shown above the predetermined threshold, the mood/emotional state 72 may be classified as neutral. Alternatively, where the perceived data is contradictory (e.g., the user exhibited both happy and sad indicators), the mood/emotional state 72 may be classified as neutral. Conflicting emotional states may alternatively be classified as "mixed" or "unknown." Such classifications may be updated to one state or another as the engines 44, 52 and/or 58 receive more data.

While it may happen that users have the same mood/emotional state 72, the mood/emotional state 72 may be independently set for each user, depending on the detected physical traits of each user. In embodiments, it is also contemplated that a mood/emotional state 72 be determined for a group of users together. The group mood/emotional state 72 may be determined a number of ways, including by taking a predominant mood/emotional state 72 exhibited by the respective group members. Confidence values as to how strongly one or more of the group members are classified within a particular mood/emotional state 72 may also factor into the group mood/emotional state determination.

Using information from one or more of the above-described software engines and/or other sources, the present system may also determine a user's attentiveness 74 to particular presented content. In general, a user's attentiveness to particular presented content may have a wide variety of physical indicators, including for example body language, posture, facial expression and/or vocal responses, which indicators may be sensed by one or more of the engines 52, 58 and/or 64. Head position and/or facial expression may further be indicators of attentiveness. In further embodiments, eye tracking may also be an indicator of attentiveness. Where a camera is able to track eye movements, a user frequently looking away from content may be an indicator that the user has a low attentiveness to the content, whereas a user seldom moving his or her eyes away from content may be an indicator of a high level of attentiveness.

In the description that follows, high attentiveness is treated as the user being interested in content and wishes to continue to view the content. However, it is contemplated that high attentiveness, when coupled with other user actions, indicates that, while attentive to the content, the user does not wish to continue to view the content. For example, where attentiveness indicators are accompanied by screaming or other indicators of annoyance, fear or discomfort, the inference may be drawn that the user does not wish to continue viewing certain content, despite it holding his or her attention. The system may propose alternative content in this instance as explained below. It may happen that a detected emotional response is desirable for a first user, but not a second user. For example, a child may not like being afraid, where an adult may enjoy content which is scary. These preferences may be set in the user preferences, so that content which instills fear when a child is identified (in this example) may be changed, but that same content continued when an adult is identified.

It is understood that the above described engines and libraries for detecting attentiveness are by way of example only. It is understood that other detection devices and software modules may be used instead of or in addition to those described above for discerning attentiveness.

In one embodiment, user attentiveness 74 may be classified as "low", "medium" or "high" based on the types of movements, gestures and facial expressions performed by the user while experiencing the presented content. Other gradations and classifications of attentiveness are contemplated. In one example, attentiveness 74 may be determined to be "low" if the captured image data indicates that the user moved away from the field of view of the capture device or if the user's head was turned away from the device presenting the content. Similarly, attentiveness 74 may be determined to be "low" if the user's facial expression indicated one of boredom or if a user's vocal response indicated a yawn. Attentiveness 74 may be determined to be "medium" if for example the captured image data indicates that the user moved away from the field of view of the capture device for a threshold percentage of time while receiving the content. The threshold percentage of time may be pre-determined by the computing device 12, in one implementation. Similarly, attentiveness 74 may be determined to be "high" if the user was within the field of view of the capture device for the duration of the content, faced the device presenting the content and/or leaned toward the device presenting the content. Attentiveness 74 may also be set as high where a user is singing, humming, clapping or exhibiting some other enthusiastic auditory response.

It is to be appreciated that the types of gestures, movements, facial expressions and auditory responses utilized to determine one of a low, medium or a high categorization of attentiveness as discussed above are for illustrative purposes. Different combinations of gestures, movements, facial expressions and auditory responses may also be utilized to determine a user's responses to received content in other embodiments. Moreover, it is understood that a user's attentiveness may be broken into fewer or more classes than three in further embodiments, each of varying degrees of attentiveness.

Referring again to FIG. 1, the environment 5 may further include one or more additional computing devices, such as for example laptop 80 and mobile computing device 82, which in embodiments may be a mobile telephone, a tablet computer or other mobile devices. The environment 5 may include further computing devices, or may operate without one or both of computing devices 80 and 82, in further embodiments.

Where computing devices 80 and/or 82 are provided in addition to computing device 12 of system 10, the various computing devices may be paired with each other, or otherwise operatively connected so as to be able to exchange information with each other, share the running of an application and handoff content from one device to the other. Further details of a system enabling this operative connectivity are described in U.S. patent application Ser. No. 12/820,982, entitled "System for Interaction of Paired Devices," filed Jun. 22, 2010, which application is incorporated by reference herein in its entirety. The laptop 80, mobile device 82 or other computing devices may come and go from environment 5. In embodiments, environment 5 may include only system 10.

In embodiments of the present technology, customized content is automatically selected and recommended to one or more users based on user preferences 42 that the user sets up in profile 40. User preferences may have a wide variety of specified preferences as to what content a user wishes to receive, and under what conditions that content is to be received (for example only when the user is alone and not in a group). The user preferences may also set up how the content is to be displayed to the user. For example, when a user is alone, she may want to view her email on display 14, but when others are present, she may want to view her email on a more personal device, such as laptop 80. The following sets forth a few examples of user preferences that may be set by a user to control the content they receive, and the manner and conditions under which it is presented. Each user of a system 10 may specify and save their own user preferences 42 with their profile 40.

User preferences 42 may include specifying content preferences 84, specifying the types of content a user would like to receive. Content preferences may include for example a designation that a user would like to receive personal content, such as email, calendar, social interaction websites, photo albums, and/or public content, such as movies, news feeds, music and other multimedia content. The content preferences may specify broad categories of content the user is interested in, at which point content may be selected from within these categories at random or by some relevance criteria specified by the user. The user may also designate specific content that the user would like to receive, such as for example a gaming application, their email, or content from their favorite television show. In embodiments, content preferences 84 may incorporate parental controls, or some other definition of content that a user does not, or cannot, receive. It is understood that content may be specified in content preferences 84 according to a wide variety of other classifications and criteria.

The user preferences 42 may further include specification of device preferences 86, meaning the devices on which a user wishes to receive the specified content. For example, a user may specify that they want to receive their video content on display 14, their email on laptop 80, text messages on their mobile device 82 and music over a dedicated sound system. A device preference 86 may be set for each content or content type specified in content preference 84. The user may specify that a given content is only to be displayed on the device specified in device preferences 86. Alternatively, the user may specify a primary preference and one or more backup preferences in the event their primary device is unable to display their selected content. If no device preference is set for given content, that content may be presented based on a default setting which selects the optimal available device to present the content. Users typically multitask, meaning they can set up their preferences to receive multiple content feeds on multiple specified devices at the same time.

A user may further specify temporal-based preferences 88 in user preferences 42. Temporal-based preferences relate to when a user wishes to receive the content specified in content preferences 84. Different content may be specified for receipt at different times. For example, on weekday mornings before work, the user may have a first group of settings, such as to receive a news feed of current events and their calendar on display 14, and their email on their mobile device 82. In the weekday evenings, the user may have a second group of settings, such as to receive pictures of the day and possibly passive multimedia such as a movie. On weekends, the user may have a third group of settings, for example to receive notice of recreational activities from one or more public calendars. The above is by way of example, and it is appreciated that the user may define any scheme of temporal preferences as to what content is to be received when.

User preferences 42 may further include solitary vs. group-based preferences 90. It may happen that a user may wish to experience content a first way when they are alone, and a second, different way when they are not alone. It may be that they want to display personal content on the public display 14 when they are alone, but wish to view that content on a more private display such as laptop 82 when others are in the room. This preference may be unrelated to privacy concerns, such as for example where a user does not want to inconvenience others with content displayed on public display 14 when that content would be of no interest to others. Regardless of the reason, a user may set any number of solitary vs. group-based preferences 90 in the user preferences 42. The solitary vs. group-based preferences 90 define how content presentation described in other user preferences may be modified based on whether the user is alone or others are present.

The solitary vs. group-based preferences 90 may simply have settings which distinguish between the user being alone versus not alone in the environment 5. Alternatively, the solitary vs. group-based preferences 90 may have greater resolution, allowing a user to set different content presentation preferences based not only on whether there is someone else in the room, but who that additional person or people are. Thus, the user may set default preferences for content delivery when they are alone, a first alternative setting when a first group of one or more people is present, a second alternative setting when a second group of one or more people is present, etc.

As one of a wide variety of possible examples, a user may have user preferences which display a twitter feed and their email on display 14 when they are alone. When a person from a first group of defined individuals, such as for example one or more friends, walks into the room, the email may move from display 14 to laptop 80 while the twitter feed remains on display 14. If a person from a second group of defined individuals, such as for example a parent, next walks in to the room, the twitter feed may move from the public display to the user's mobile device 82, or the twitter feed may turn off altogether. In this example, if the user were alone, viewing the twitter feed and email on the public display 14, and the person from the second group walks in, the email may then move to the laptop 80 and the twitter feed may also move to the user's mobile device. Again, this illustration is by way of example only, and the user is free to define any variation of solitary vs. group-based preferences 90. In the example above, the user moved content from the public display 14 to a more private display when someone else entered the room. The opposite is also possible, so that a user may be experiencing content on a private screen, and a user sets a preference in solitary vs. group-based preferences 90 to move that content to the more public display 14 when a given group of individuals enter the room, so that they may all more easily experience the content.

As indicated above, people frequently carry a mobile device with them such as their cellular telephone, and these devices may pair with other devices in environment 5 when coming into range of a device in environment 5. When a cellular telephone comes into range of one or more of the computing devices 12, 80 and 82 (or other computing devices in the environment 5), this may provide the indication of another person entering the room, thus triggering one or more of the preferences set in the solitary vs. group-based preferences 90. This may occur by other methods as well, such as for example a user entering the field of view of the cameras of capture device 20, or within range of the microphone 30 of capture device 20. These mechanisms may also be able to identify the new person. Other methods and mechanisms may be used to determine when another person enters the room, at least some of which may also be able to determine an identity of the entering person.

When a new person enters the room, triggering a change in content deliver per some setting in the solitary vs. group-based preferences 90, the system may prompt the user to check whether they want the change made. Alternatively, the change may simply happen automatically without a system prompt. Whether the system prompts first or simply changes content may be set by the user.

Another user preference which may be specified is emotional-based user preferences 92. As described above, embodiments of the present technology may be able to detect a mood or emotional state of a user. The emotional-based user preferences 92 allow a user to set content delivery preferences based on the user's mood or emotional state, as indicated for example by the mood/emotional state 72. It is understood that any of a wide variety of user preferences may be set for the emotional-based user preferences 92. A user may designate specific content, such as a particular song or video for each of the one or more categories of mood/emotional state 72. For example, where a user is sad, he may want to hear his favorite song, view an uplifting movie or play his favorite game. When a user is mad, he may want soothing content. For detection of a given mood/emotional state, the user may set specific content, or may specify a broad classification of content from which specific content is selected at random or by some relevance criteria specified by the user. The user may alternatively group moods/emotional states together, so that specified content is delivered when any mood/emotional state in the group is indicated by state 72.

As noted above, emotional states may be no more than a transient and temporary response to a given stimulus, where moods tend to be more sustained. Accordingly, in alternative embodiments, the preferences defined in the emotional-based user preferences 92 may be based on mood detection and not emotional state. That way, the system is not constantly recommending new content each time a change in emotional state is detected. In embodiments, the present system may distinguish between moods and emotional states based on the length of time an emotional state is maintained. Where an emotional state is maintained for a predefined period of time, it may then be considered a mood.

Another user preference in profile 40 may be learned preferences 94. These are preferences that are not set by a user, but are in fact learned by one or more computing devices in environment 5, and added to user preferences 42. For example, the system may learn over time that at certain times, or when in certain moods, the user typically seeks particular content, or content from a particular category. The system may learn over time which devices are typically used for particular content. These preferences learned over time may be automatically added to user preferences 42 as learned preferences 94. Of course, a user may control the degree to which learned preferences may be added, and whether particular recommended learned preferences get added to learned preferences 94. In embodiments, learned preferences may be omitted, or a user may completely disable learned preferences 94.

The above defined classes of user preferences are by way of example only, and one or more of them may be omitted in further embodiments. It is understood that other user preference classes may also be defined and used in addition to or instead of those described above within user preferences 42.

In addition to providing user preferences, a user may further define a hierarchy of how and in what order of priority those user preferences are to be applied. As one of many different possibilities, a user may specify a default where content is to be delivered according to content preferences 84, device preferences 86, temporal-based preferences 88 and solitary vs. group-based preferences 90 (each of which may be implemented in concert with each other). The user may further specify for example that where one or more moods/emotional states are detected, that supersedes one or more of the content preferences 84, device preferences 86, temporal-based preferences 88 and/or and solitary vs. group-based preferences 90, so that content is presented in the manner defined in the mood/emotional state preference 92. This implementation is by way of example only, and a variety of other hierarchies may be defined in the user preferences.

A user may further define priority settings 96, which are used in the event the user's content presentation preferences conflict with the user preferences of a second user also using one or more devices in environment 5. In one example, a user may specify one or more other users, and which user preferences are to be given priority between the two users in the event of a conflict. It may happen for example that, with first and second users, both define that their user preferences are to be given priority over the other. In this instance, the priority settings 96 would not resolve the conflict. Here, the system may provide an audible and/or visible prompt, asking the users to specify how they would like the conflict resolved and what content to provide.

As explained below, it is a goal of the present technology to find common interests between users when these users are both (or all) interacting with the environment 5, and to present content consistent with the identified commonality. As explained below, conflicts may first be looked for and, if found, resolved by the users' priority settings 96. Thereafter, the system may then look for commonality.

If a conflict between two or more users results from their respective user preferences, the system may first look to the users' respective priority settings 96 to resolve the conflict. However, it may happen that the users' priority settings 96 do not resolve the conflict. The users may have no priority settings, or no priority settings that apply to a given conflict. Alternatively, as mentioned above, the priority settings 96 of respective users may resolve the conflict in a conflicting way (for example both specifying that their content is to take priority). In this case, the system may provide an audible and/or visible prompt, asking the users to specify how they would like the conflict resolved and what content to provide.

Using the above-described preferences, the computing device 12 (or another computing device in the environment 5) may automatically select content to be presented to a user when the environment identifies that the user is present. The system may prompt the user with a recommendation of content before providing it. Alternatively, the system may simply present the content best suited to the user's predilection as indicated in user preferences 42. As indicated above, whether to prompt a user with recommendations or to simply present the content, may be set by user preference.

As noted, user preferences 42 may be defined for each user 18 interacting with the environment 5. In embodiments, group user preferences 98 may further be defined. A user may first define group members, and then define what, how and when content is to be delivered to that group (under one or more of the above-defined user preference classes) when the system detects that those group members are present. Thus, for example, husband 18b may define a first group settings in group preferences 98 for his wife 18a and him when they are present, a second group settings in group preferences 98 for his daughter 18c and him when they are present, and a third group settings in preferences 98 when all three are present. A wide variety of other user groups may be defined between friends, gaming partners and other user groups.

It may happen that two different users may define groups having the same group members, but have different user preferences set for the commonly-defined group. It may also happen that multiple users are present, one user has a group definition covering some or all of the users, but another group member does not. Other possibilities may exist where a group is present, but there are not consistent group preferences 98 set that cover the group as a whole. In these instances, priority settings 96 may be used as described above to resolve the conflict, or the users may be prompted to resolve the conflict. The system may additionally look for commonality between the group members and, if found, recommend content all may wish to receive.

Figure 4A:
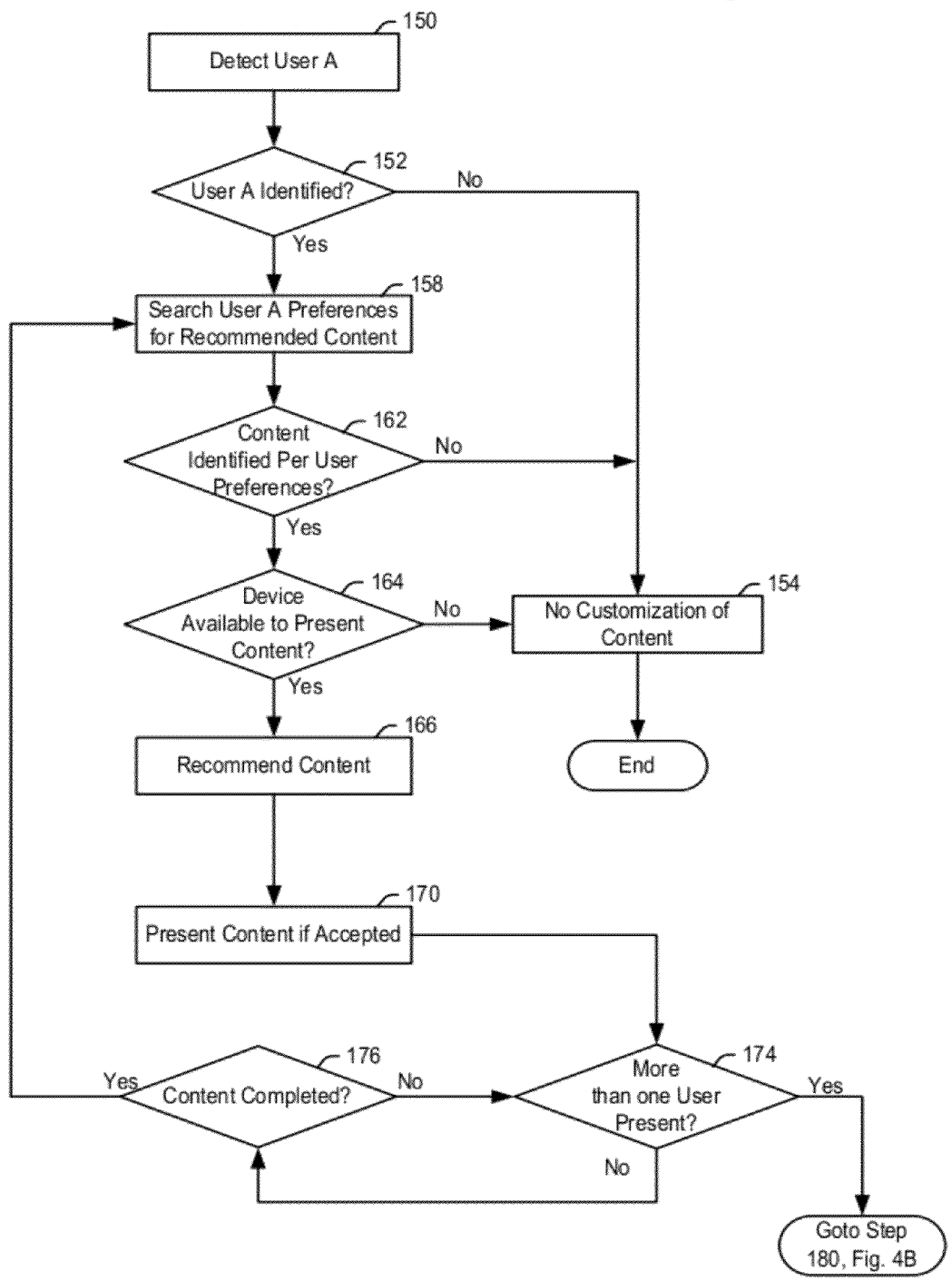
FIGS. 4A and 4B are flowcharts of an embodiment of the present technology for identifying users and selecting content based on a user's identity.
Figure 4B:
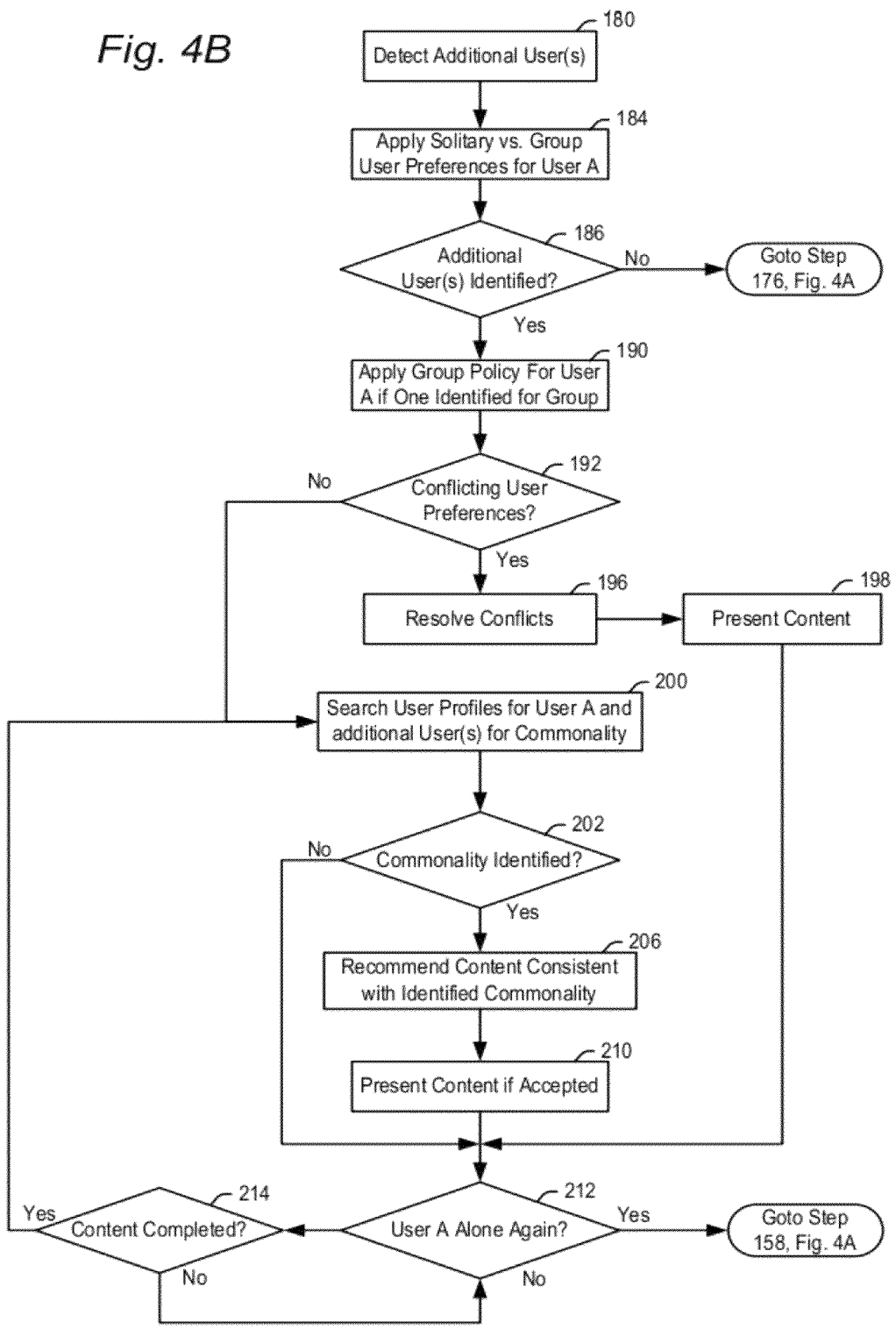
Figure 5A:
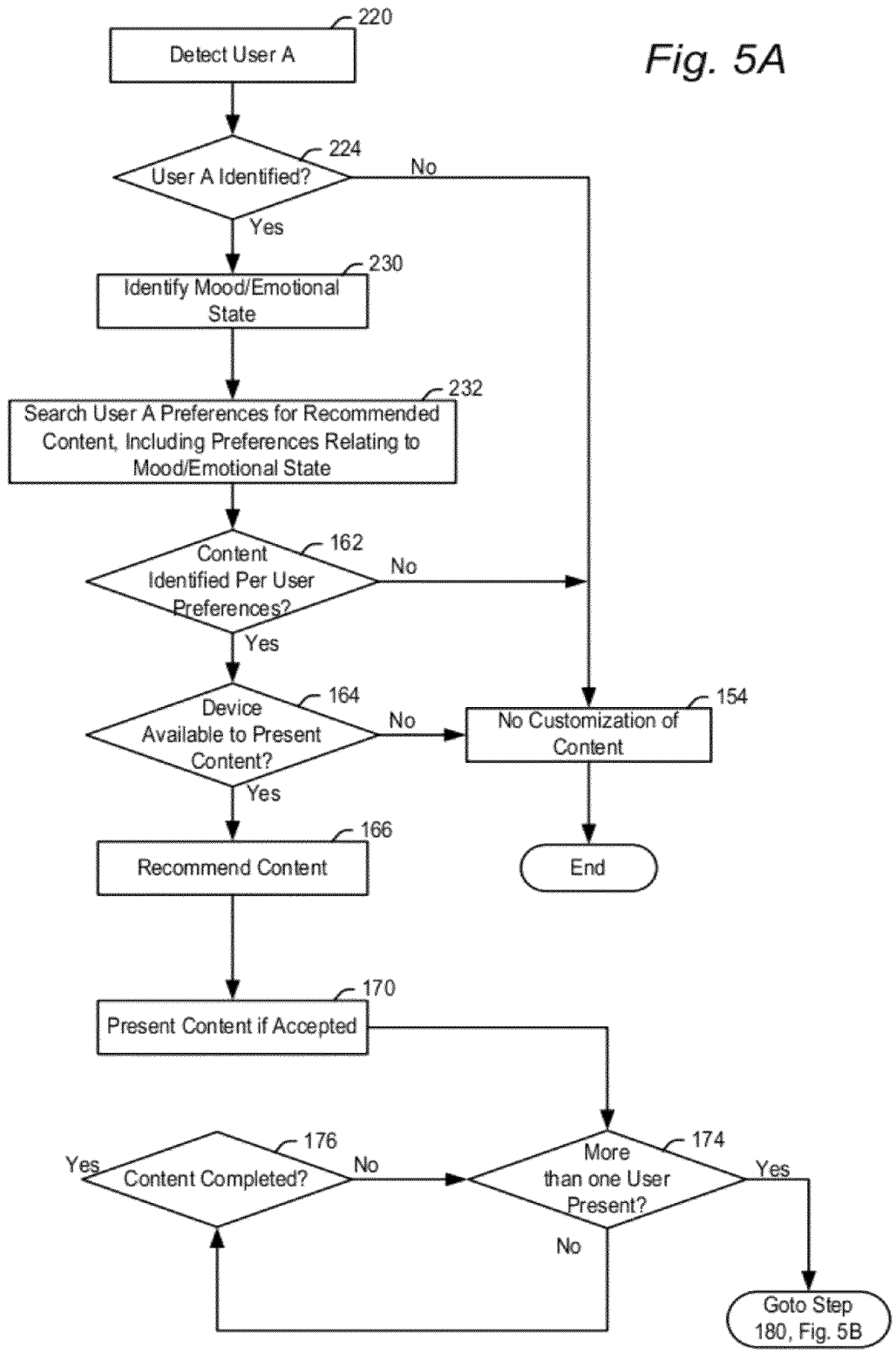
FIGS. 5A and 5B are flowcharts of an embodiment of the present technology for identifying users and emotional state and selecting content based on a user's identity and emotional state.
Figure 5B:
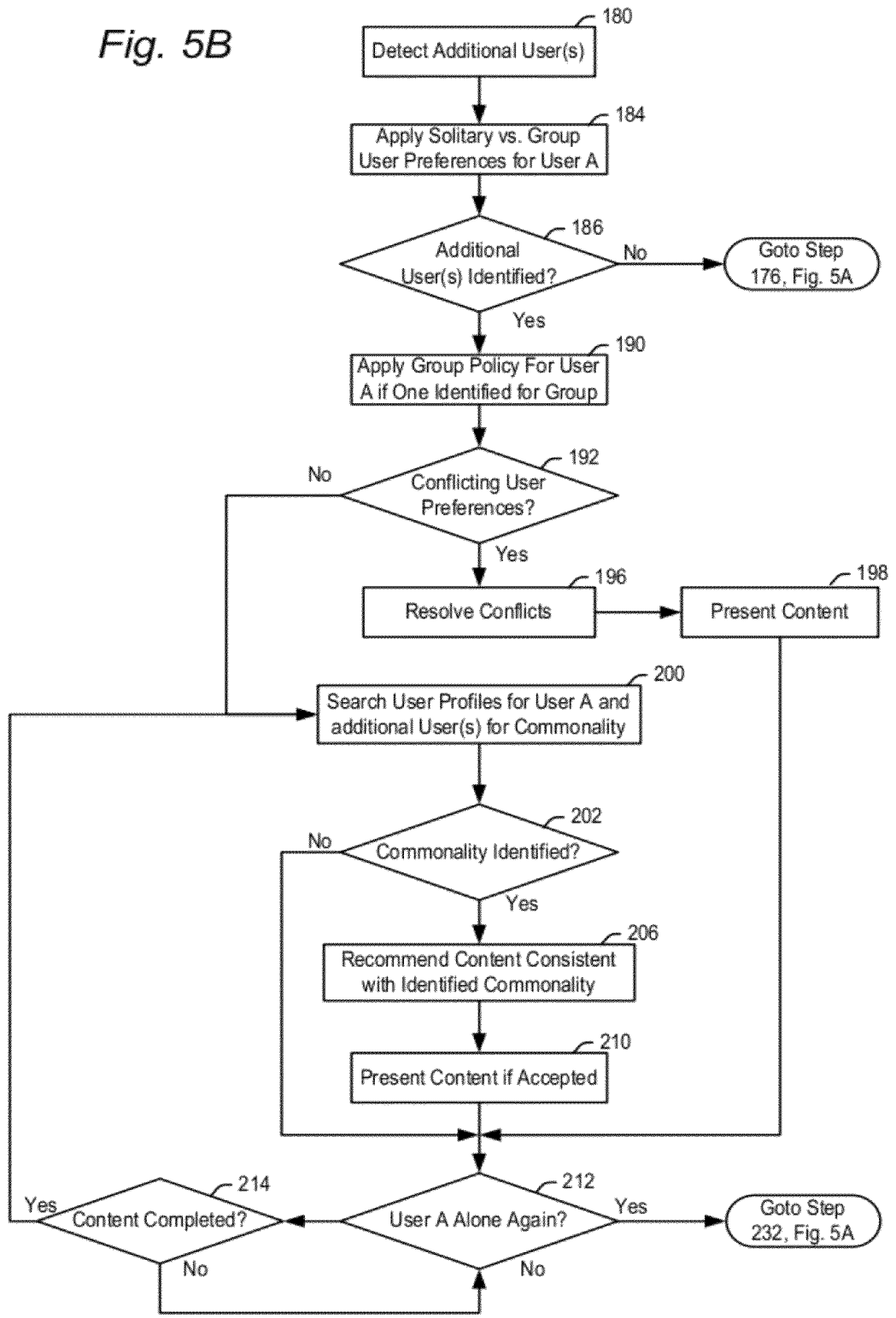
Figure 6A:
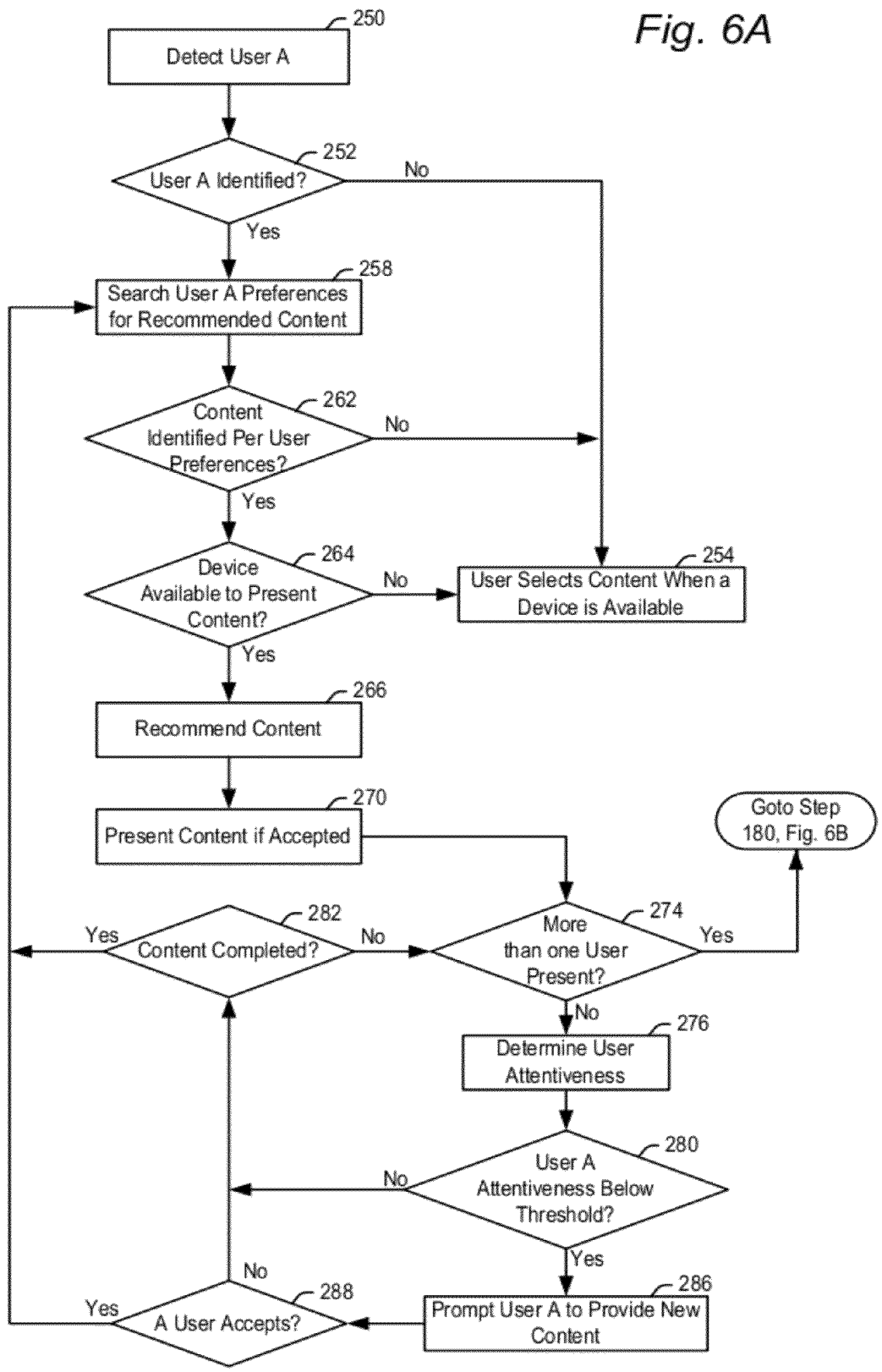
FIGS. 6A and 6B are flowcharts of an embodiment of the present technology for determining use attentiveness to content and selecting content based on a user's attentiveness.
Figure 6B:
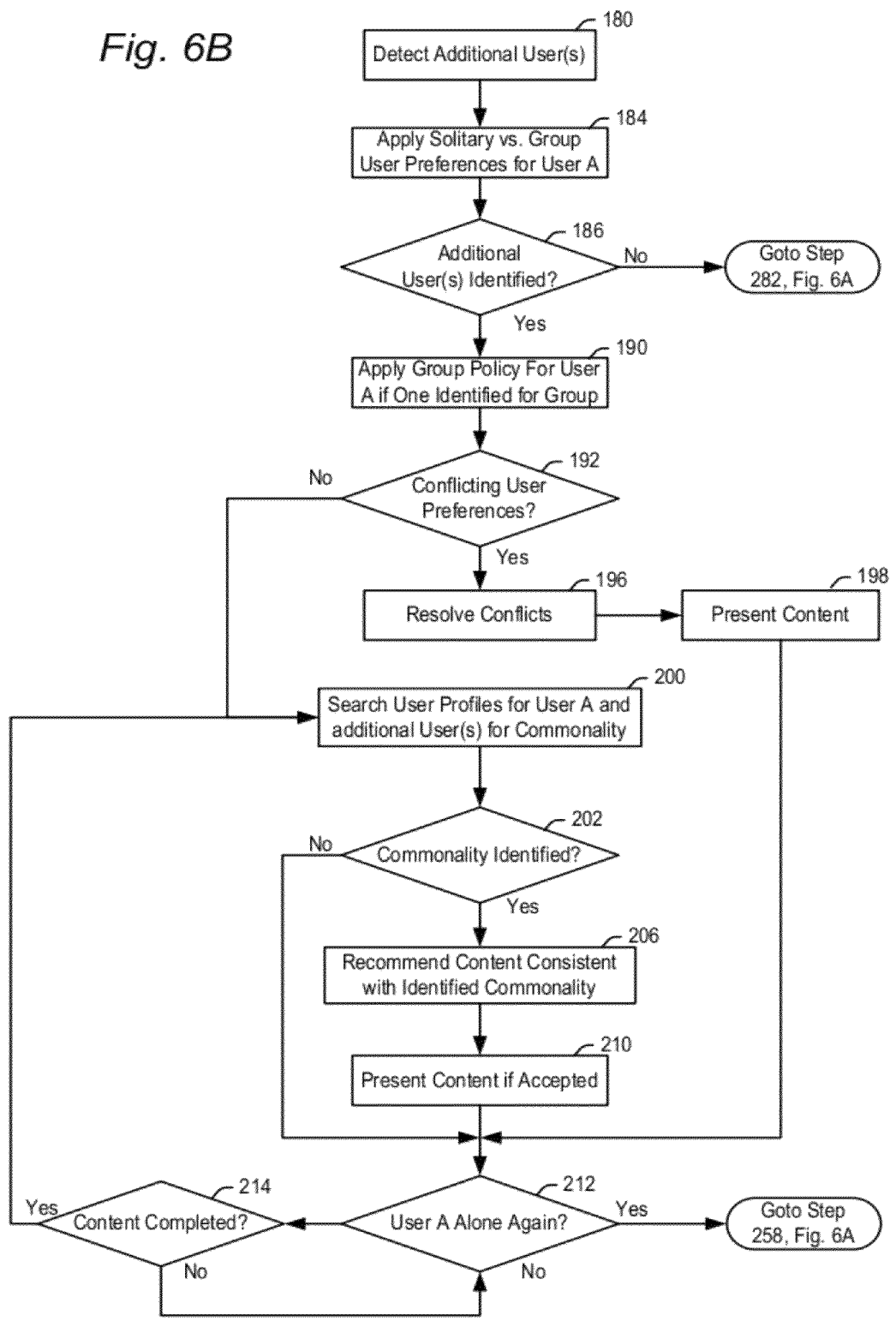

Flowcharts showing the operation of various embodiments of the present technology will now be explained with reference to FIGS. 4A through 6B. In the embodiment of FIGS. 4A and 4B, the system customizes content based on identification of one or more users. This embodiment does not take into account mood/emotional state 72 or user attentiveness 74. FIGS. 5A and 5B show an embodiment that takes both user identification and mood/emotional state 72 into account when customizing content for a user. FIGS. 6A and 6B show an embodiment that takes user attentiveness 74 into account when recommending content to the user.

Referring now to FIG. 4A, in step 150, one or more of the computing devices in environment 5 detects the presence of a user, in this example referred to as user A. This may be detected for example by a device carried by the user pairing with a device in environment 5, or the user being detected by capture device 20 as described above. In step 152, the system may attempt to determine the identity of user A. In embodiments, this may be determined and stored as identification 70 (FIG. 2) as described above and/or by other identification mechanisms. If the system is not able to identify the user A, no customization of content occurs for user A (step 154) and content customization by the present system may not be performed.

If user A is identified in step 152, the system may next search user preferences 42 for the user A in step 158 to identify content customized for the user and the manner in which it is to be presented. If no user preference for content is identified in step 162, no customization of content occurs for user A (step 154) and content customization is not performed. Assuming content is identified in step 162, the system checks in step 164 whether there is a device available to present the content. If not, the system may notify user A and wait until a device becomes available. Alternatively, customization of content for user A may not be performed in step 154. Where no device is available due to others' content already being displayed on available devices, conflict resolution steps may be performed as described above.

Assuming customized content is identified in step 162 and one or more devices are available in step 164, the customized content is recommended to the user in step 166. If accepted, the content is presented to the user in accordance with user A's preferences in step 170. As described above, instead of recommending identified content before presenting it, it is contemplated that the identified content may simply present the content.

In step 174, the system checks whether one or more additional users have entered the room (or other setting for environment 5). If so, the system performs step 180, described below with respect to FIG. 4B. If no additional users are detected, the system checks whether the presented content has reached an end in step 176. If recommended content comes to an end in step 176, the system may return to step 158 to look for further recommended content. Although not indicated, a user may of course manually interrupt and change content they receive at any time.

If one or more additional users are detected in step 174, the system detects the one or more new users in step 180, for example via capture device 20 as described above. In step 184, the system applies any solitary vs. group-based user preferences 90 user A has created. As described above, this may result in change in the presented content and/or a change in the manner in which content is presented.

In step 186, the system determines whether the new user(s) can be identified as described above. If not, no further customization of the content is performed in view of the new users, and the system returns to step 176, FIG. 4A to see if the currently presented content has ended. Assuming the one or more new users are identified in step 186, the system checks whether user A has a policy which applies to the group of users then present. If so, content in accordance with the identified group policy may be presented in step 190.

In step 192, the system determines whether there are conflicts in the user preferences of one or more of the users. If so, the conflict is resolved in step 196, and the content decided upon may be presented in step 198. As discussed above, the conflict may be resolved per priority settings 96 in the user preferences 42 of the users. Alternatively, the system may prompt users as to how to resolve the conflict. As one of many possible scenarios, user 18b of FIG. 1 may be receiving content, such as for example his email. When user 18a joins him, user 18a may have a policy where, when users 18a and 18b are together, possibly in the evening, they want to receive passive content such as a movie. When user 18c joins them, user 18c may have a policy which indicates that she is unable to watch "R" rated movies. If users 18a and 18b were watching an "R" rated movie, the system may recommend new content, such as for example a "PG" movie or a sporting event that all three can watch together. This illustration is by way of example only, and it is appreciated that any of a wide variety of other scenarios may be implemented in accordance with the conflict identity and resolution steps 192, 196 and 198.

If no conflict is detected in step 192, the system may search the user profiles for all present users in step 200 for commonality between the users. If a commonality is identified in step 202, the system may be able to recommend content that all users may enjoy in step 206. As one example, the system may search the content preference 84 in the user preferences 42 for each user to try and identify content that each user has defined in common as being of interest. For example, each user may have specified a particular music artist, album or song in common, in which case this content may be recommended to the users. Each user may enjoy the same game, in which case the system may recommend the game to the users. Each user may have specified a particular actor, or movie in common, in which case the system may recommend a movie that all may enjoy. The user profiles for each user may indicate a common interest in hiking, in which case hiking content may be provided to the users. It is understood that a wide variety of other commonalities may potentially be identified.

Users may have a large amount of information about themselves in their user profile 40 outside of user preferences 42. In embodiments, the system may go beyond the user preferences 42 to search their profiles 40 in general in order to identify commonality between the users (while respecting all privacy settings). Thus for example, the system may determine that all users are from the same home town, or went to the same school, and offer to provide content on that topic.

In step 210, the recommended content may be presented if it is accepted by the group. If it is not accepted, or if no commonality is identified, the system may continue presenting the content that was being presented to user A. Alternatively, the users may select different content. If commonality is found for only a few users in the group, content based on this commonality may also be recommended in step in step 206.

In step 212, the system may determine if the one or more additional users have left the environment so that the user A is again alone. If so, the system may again perform step 158 (FIG. 4A) of searching the user preferences for user A for customized content when the user A is alone. If the user A is not alone in step 212, the system may check whether a particular delivered content piece has ended in step 214. If so, the system may again perform step 200 of looking for further content that the users may share in common. The system may loop between step 212 of detecting if the user is alone again and step 214 of detecting when content is over, until one of those determinations is affirmative.

The steps set forth in FIGS. 4A and 4B are by way of example for illustrating an embodiment where content may be customized for presentation to a user by identifying the user and accessing one or more user preferences defined by the user. It is understood that one or more of the steps may be omitted or performed in a different order, or that other steps may be added, in further embodiments of the present technology.

The embodiment now described with respect to FIGS. 5A and 5B is similar to the embodiment of FIGS. 4A and 4B, with the addition that visual indicators of emotional state may be detected, and emotion-based user preferences 92 may be detected. The system may then present customized content to the user based at least in part on the emotional state of the user. FIGS. 5A and 5B begin with a step 220 of detecting a user A and step 224 of attempting to identify the user A. If the user A is identified in step 224, the system next identifies a mood and/or emotional state for the user in step 230. The mood and/or emotional state may be provided by user mood/emotional state 72 which measures visual indicators of mood and emotion.

The mood and/or emotional state may be provided by other mechanisms in further embodiments. For example, contextual indicia may also be used as indicators establishing or confirming mood or emotion. As one example, a user's calendar, a local calendar or a national calendar may show events which would tend to put the user in a given mood. A calendar event showing the user is having a birthday, or a calendar event showing a local fair or that it is the 4$^{th}$ of July, may all be used as inferences that the user may be in a good mood. Conversely, a calendar event showing a sad event may be used as an inference that the user may be in a bad mood.

Once emotional state is determined in step 230, the system searches the user preferences for user A in step 232 to determine content to be presented to the user A. Step 232 is identical to step 158 in FIG. 4A, with the exception that step 232 of FIG. 5A includes consideration of the emotion-based user preference 92. As indicated above, this user preference may be used to tailor content to the user's mood and/or emotional state. The type of content a user may want to receive when they are happy, sad, mad, excited, scared, bored or in some other mood will vary from user to user. Users may specify a more passive and/or immersive experience when they are sad or mad, such as for example watching a movie. Users may like to receive certain types of music when they are happy, sad, etc. Any personal preferences as to content may be set in the emotion-based user preference 92 in response to different moods or emotional states. Thus, when the system detects one of these states, content corresponding to that mood/emotion may be presented to the user in step 232, in accordance with the defined hierarchy of how and in what order of priority user preferences are to be applied.

The remaining steps in the flowcharts of FIGS. 5A and 5B may be identical to the same numbered steps in FIGS. 4A and 4B. The steps for FIGS. 5A and 5B are by way of example for illustrating an embodiment where content may be presented to a user by identifying the user and the user's mood/emotional state, and presenting content customized for the user based on the user's preferences. It is understood that one or more of the steps in FIGS. 5A and 5B may be omitted or performed in a different order, or that other steps may be added, in further embodiments of the present technology.

FIGS. 6A and 6B are a further embodiment where the user's attentiveness to content is determined, and actions are taken in part based on the determined attentiveness. The embodiment of FIGS. 6A and 6B may be used with embodiments where content is customized and automatically presented based on identifying the user and/or an emotional state of the user. However, as explained below, the present system may take actions based on a user's determined attentiveness even where the system is unable to identify a user or their emotional state.

Referring now to FIGS. 6A and 6B, many of the steps are identical to those explained above. In step 250, the user A is detected and in step 252, the user A is identified. Unlike the above-described embodiments, where the system is unable to identify the user, the present embodiment may allow the user to manually select content in step 254 and continue. If user A is identified, the system may search the user preferences of user A in step 258 to determine what content to deliver to user A and the manner in which it is to be delivered. If content is identified in step 262 and there are one or more available devices on which to present this content in step 264, the system may recommend that content in step 266. The content may be presented to the user in step 270 if accepted.

In step 274, the system may determine if there are additional users present. If so, the system may perform step 180 in FIG. 6B. If not, the system determines user attentiveness in step 276. In particular, as discussed above, the user's attentiveness may be determined and identified in user attentiveness 74, which in one example may be classified as "low," "medium," or "high" (though other classifications are possible).

In step 280, the system checks whether an attentiveness rating for the user for the content is below a predefined threshold. The threshold may be arbitrarily set for attentiveness 74, for example between medium and low. In such an example, where user attentiveness 74 is below medium, the user may be prompted in step 286 as to whether they want to change the content they are receiving. If the user accepts in step 288, the user's preferences may again be searched in step 258 for new content to provide to the user. It is understood that, where multiple users are present, any one of the users may provide an indication that they wish the content changed. In this event, the system may look for content for the group as explained above.

On the other hand, if the user's attentiveness 74 is above the predefined threshold in step 280, or if the user elects to stay with the current content in response to the prompt in step 288, the current content may be maintained. In this instance, the system checks whether the content is completed in step 282. If so, new content is selected in step 258. The system loops between checking for new content in step 282 and looking for additional users in step 274, checking each time through the loop whether the attentiveness 74 has dropped below the threshold in step 280.

In embodiments, the threshold may incorporate a temporal factor, meaning that the system needs to detect multiple instances of an attentiveness 74 below the threshold in step 280 before the user is prompted as to whether they wish to change the content in step 286. The length of time over which attentiveness 74 must be below (or average below) the threshold may be arbitrarily set and may vary in different embodiments.

The remaining steps in the flowcharts of FIGS. 6A and 6B may be identical to the same numbered steps in FIGS. 4A and 4B. These steps for FIGS. 6A and 6B are by way of example for illustrating an embodiment where content may be customized for presentation to a user by identifying a user's attentiveness to received content. It is understood that one or more of the steps in FIGS. 6A and 6B may be omitted or performed in a different order, or that other steps may be added, in further embodiments of the present technology.

In embodiments, attentiveness 74 may also be used to build a recommendations engine for given content. In particular, attentiveness 74 provides objective criteria by which given content may be rated. If a number of users tended to look away, yawn, or operate other devices while experiencing a first content, and tended to pay attention while experiencing a second content, this may be objective evidence that the first content is less interesting than the second content (at least for a group of individuals having somewhat common interests). The actual number of times a user looked away, yawned or performed other objective evidence of non-attentiveness may be tallied across a population sample for a wide variety of contents. Each content may then be rated relative to others based on the population sample's attentiveness. This information may be stored and made available to other users when deciding what content to receive.

The gesture recognition engine 46, facial recognition engine 52, body language engine 58 and/or voice recognition engine 64 may be used to rate content as to other factors in a similar manner, such as for example how funny, sad, scary, romantic, exciting, etc. a content piece may be relative to other content pieces.

Figure 7A:
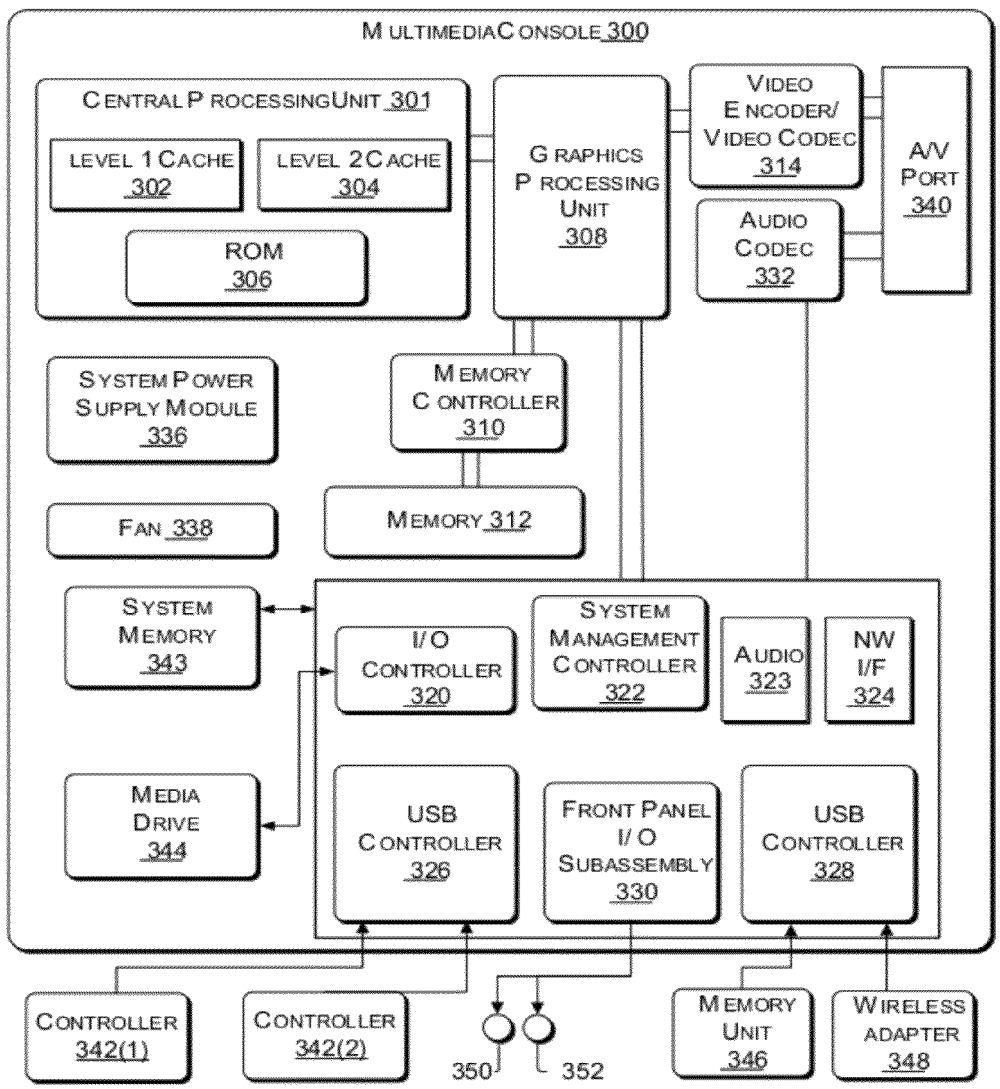
FIG. 7A illustrates an example embodiment of a computing device that may be used to interpret one or more gestures in a target recognition, analysis, and tracking system.

FIG. 7A illustrates an example embodiment of a computing environment that may be used for example as computing device 12. The computing device 12 may be a multimedia console 300, such as a gaming console. As shown in FIG. 7A, the multimedia console 300 has a central processing unit (CPU) 301 having a level 1 cache 302, a level 2 cache 304, and a flash ROM 306. The level 1 cache 302 and a level 2 cache 304 temporarily store data and hence reduce the number of memory access cycles, thereby improving processing speed and throughput. The CPU 301 may be provided having more than one core, and thus, additional level 1 and level 2 caches 302 and 304. The flash ROM 306 may store executable code that is loaded during an initial phase of a boot process when the multimedia console 300 is powered ON.

A graphics processing unit (GPU) 308 and a video encoder/video codec (coder/decoder) 314 form a video processing pipeline for high speed and high resolution graphics processing. Data is carried from the GPU 308 to the video encoder/video codec 314 via a bus. The video processing pipeline outputs data to an A/V (audio/video) port 340 for transmission to a television or other display. A memory controller 310 is connected to the GPU 308 to facilitate processor access to various types of memory 312, such as, but not limited to, a RAM.

The multimedia console 300 includes an I/O controller 320, a system management controller 322, an audio processing unit 323, a network interface controller 324, a first USB host controller 326, a second USB host controller 328 and a front panel I/O subassembly 330 that are preferably implemented on a module 318. The USB controllers 326 and 328 serve as hosts for peripheral controllers 342(1)-342(2), a wireless adapter 348, and an external memory device 346 (e.g., flash memory, external CD/DVD ROM drive, removable media, etc.). The network interface 324 and/or wireless adapter 348 provide access to a network (e.g., the Internet, home network, etc.) and may be any of a wide variety of various wired or wireless adapter components including an Ethernet card, a modem, a Bluetooth module, a cable modem, and the like.

System memory 343 is provided to store application data that is loaded during the boot process. A media drive 344 is provided and may comprise a DVD/CD drive, hard drive, or other removable media drive, etc. The media drive 344 may be internal or external to the multimedia console 300. Application data may be accessed via the media drive 344 for execution, playback, etc. by the multimedia console 300. The media drive 344 is connected to the I/O controller 320 via a bus, such as a Serial ATA bus or other high speed connection (e.g., IEEE 1394).

The system management controller 322 provides a variety of service functions related to assuring availability of the multimedia console 300. The audio processing unit 323 and an audio codec 332 form a corresponding audio processing pipeline with high fidelity and stereo processing. Audio data is carried between the audio processing unit 323 and the audio codec 332 via a communication link. The audio processing pipeline outputs data to the A/V port 340 for reproduction by an external audio player or device having audio capabilities.

The front panel I/O subassembly 330 supports the functionality of the power button 350 and the eject button 352, as well as any LEDs (light emitting diodes) or other indicators exposed on the outer surface of the multimedia console 300. A system power supply module 336 provides power to the components of the multimedia console 300. A fan 338 cools the circuitry within the multimedia console 300.

The CPU 301, GPU 308, memory controller 310, and various other components within the multimedia console 300 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 300 is powered ON, application data may be loaded from the system memory 343 into memory 312 and/or caches 302, 304 and executed on the CPU 301. The application may present a graphical user interface that provides a consistent user experience when navigating to different media types available on the multimedia console 300. In operation, applications and/or other media contained within the media drive 344 may be launched or played from the media drive 344 to provide additional functionalities to the multimedia console 300.

The multimedia console 300 may be operated as a standalone system by simply connecting the system to a television or other display. In this standalone mode, the multimedia console 300 allows one or more users to interact with the system, watch movies, or listen to music. However, with the integration of broadband connectivity made available through the network interface 324 or the wireless adapter 348, the multimedia console 300 may further be operated as a participant in a larger network community.

When the multimedia console 300 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 300 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 301 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 342(1) and 342(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 300.

Figure 7B:
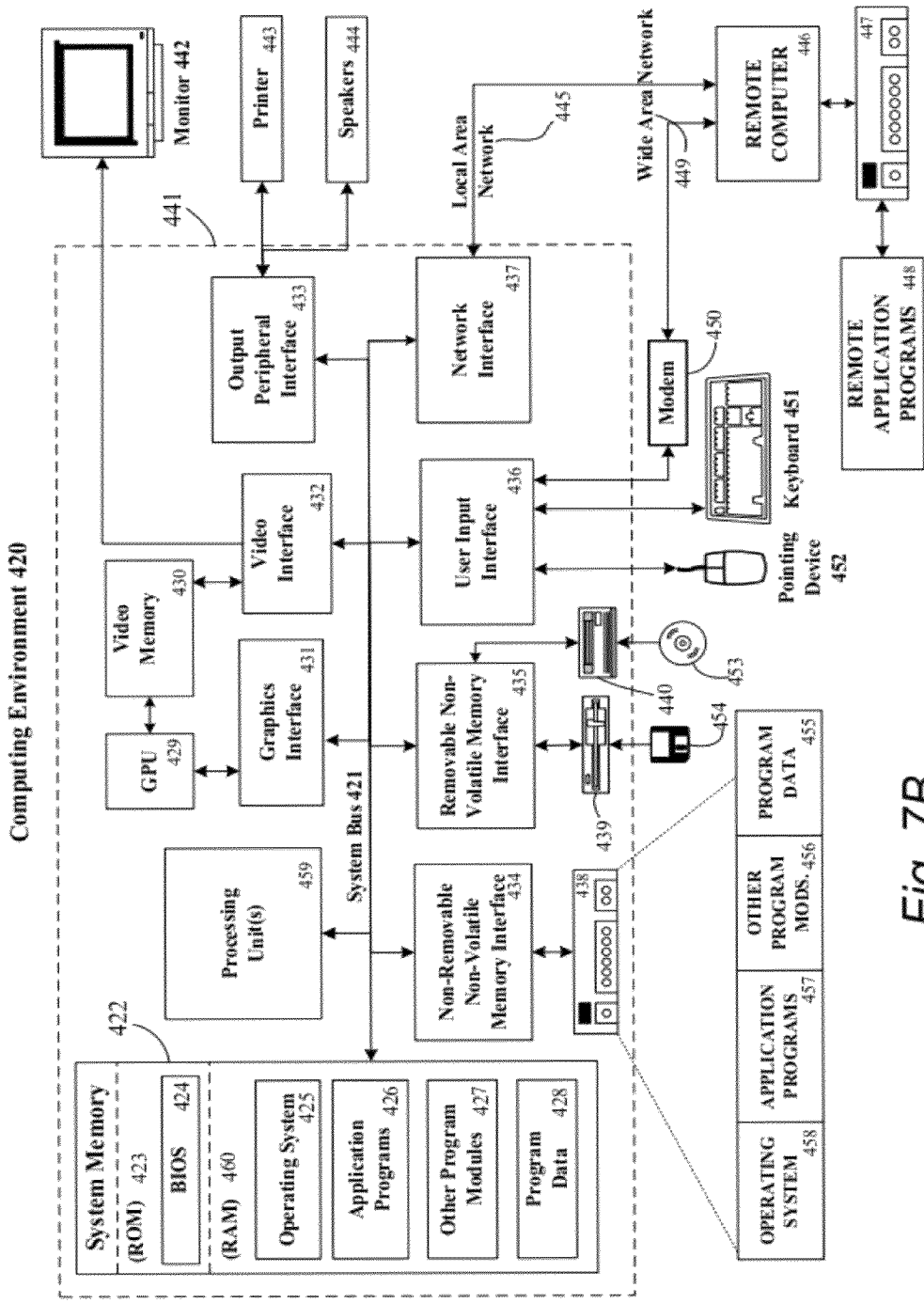
FIG. 7B illustrates another example embodiment of a computing device that may be used to interpret one or more gestures in a target recognition, analysis, and tracking system.

FIG. 7B illustrates another example embodiment of a computing environment 720 that may be the computing environment 12 shown in FIGS. 1A-2 used to interpret one or more positions and motions in a target recognition, analysis, and tracking system. The computing system environment 720 is only one example of a suitable computing environment and is not intended to suggest any limitation as to the scope of use or functionality of the presently disclosed subject matter. Neither should the computing environment 720 be interpreted as having any dependency or requirement relating to any one or combination of components illustrated in the Exemplary operating environment 720. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 7B, the computing environment 420 comprises a computer 441, which typically includes a variety of computer readable media. Computer readable media can be any available media that can be accessed by computer 441 and includes both volatile and nonvolatile media, removable and non-removable media. The system memory 422 includes computer storage media in the form of volatile and/or nonvolatile memory such as ROM 423 and RAM 460. A basic input/output system 424 (BIOS), containing the basic routines that help to transfer information between elements within computer 441, such as during start-up, is typically stored in ROM 423. RAM 460 typically contains data and/or program modules that are immediately accessible to and/or presently being operated on by processing unit 459. By way of example, and not limitation, FIG. 7B illustrates operating system 425, application programs 426, other program modules 427, and program data 428. FIG. 7B further includes a graphics processor unit (GPU) 429 having an associated video memory 430 for high speed and high resolution graphics processing and storage. The GPU 429 may be connected to the system bus 421 through a graphics interface 431.

The computer 441 may also include other removable/non-removable, volatile/nonvolatile computer storage media. By way of example only, FIG. 7B illustrates a hard disk drive 438 that reads from or writes to non-removable, nonvolatile magnetic media, a magnetic disk drive 439 that reads from or writes to a removable, nonvolatile magnetic disk 454, and an optical disk drive 440 that reads from or writes to a removable, nonvolatile optical disk 453 such as a CD ROM or other optical media. Other removable/non-removable, volatile/nonvolatile computer storage media that can be used in the Exemplary operating environment include, but are not limited to, magnetic tape cassettes, flash memory cards, digital versatile disks, digital video tape, solid state RAM, solid state ROM, and the like. The hard disk drive 438 is typically connected to the system bus 421 through a non-removable memory interface such as interface 434, and magnetic disk drive 439 and optical disk drive 440 are typically connected to the system bus 421 by a removable memory interface, such as interface 435.

The drives and their associated computer storage media discussed above and illustrated in FIG. 7B, provide storage of computer readable instructions, data structures, program modules and other data for the computer 441. In FIG. 7B, for example, hard disk drive 438 is illustrated as storing operating system 458, application programs 457, other program modules 456, and program data 455. Note that these components can either be the same as or different from operating system 425, application programs 426, other program modules 427, and program data 428. Operating system 458, application programs 457, other program modules 456, and program data 455 are given different numbers here to illustrate that, at a minimum, they are different copies. A user may enter commands and information into the computer 441 through input devices such as a keyboard 451 and a pointing device 452, commonly referred to as a mouse, trackball or touch pad. Other input devices (not shown) may include a microphone, joystick, game pad, satellite dish, scanner, or the like. These and other input devices are often connected to the processing unit 459 through a user input interface 436 that is coupled to the system bus, but may be connected by other interface and bus structures, such as a parallel port, game port or a universal serial bus (USB). The cameras 26, 28 and capture device 20 may define additional input devices for the console 400. A monitor 442 or other type of display device is also connected to the system bus 421 via an interface, such as a video interface 432. In addition to the monitor, computers may also include other peripheral output devices such as speakers 444 and printer 443, which may be connected through an output peripheral interface 433.

The computer 441 may operate in a networked environment using logical connections to one or more remote computers, such as a remote computer 446. The remote computer 446 may be a personal computer, a server, a router, a network PC, a peer device or other common network node, and typically includes many or all of the elements described above relative to the computer 441, although only a memory storage device 447 has been illustrated in FIG. 7B. The logical connections depicted in FIG. 7B include a local area network (LAN) 445 and a wide area network (WAN) 449, but may also include other networks. Such networking environments are commonplace in offices, enterprise-wide computer networks, intranets and the Internet.

When used in a LAN networking environment, the computer 441 is connected to the LAN 445 through a network interface or adapter 437. When used in a WAN networking environment, the computer 441 typically includes a modem 450 or other means for establishing communications over the WAN 449, such as the Internet. The modem 450, which may be internal or external, may be connected to the system bus 421 via the user input interface 436, or other appropriate mechanism. In a networked environment, program modules depicted relative to the computer 441, or portions thereof, may be stored in the remote memory storage device. By way of example, and not limitation, FIG. 7B illustrates remote application programs 448 as residing on memory device 447. It will be appreciated that the network connections shown are Exemplary and other means of establishing a communications link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed is:

1. A method of customizing content for presentation to a user via one or more computing devices, comprising:
    (a) identifying:
        (a1) one or more users within perception range of a computing device of the one or more computing devices upon detection of the presence of the one or more users within the perception range of the computing device, and
        (a2) an emotional state or mood of one or more users within perception range of a computing device of the one or more computing devices via gestures performed by the user; and
    (b) providing content to the user via the one or more computing devices based on an identity of the one or more users and/or emotional state or mood of the one or more users of said step (a).

2. The method of claim 1, further comprising the step (c) of identifying an attentiveness of a user to the content, and providing content based on the attentiveness identified in said step (c).

3. The method of claim 1, further comprising the step of receiving user preferences relating to specified times during a day, portion of a day, week or month at which a users wishes to receive content, and receiving user preferences relating to what content the user would like to receive at the specified times.

4. The method of claim 1, said step (b) comprising the step (d) of receiving user preferences associated with the user, and providing content in accordance with the user preferences of the user upon identification of the user.

5. The method of claim 4, said method comprising the step of receiving user preferences relating to the type of content the user wishes to receive, and the type of content the user wishes to receive when in a particular mood or emotional state, and presenting content to the user based on the user preferences upon identification of at least one of the user identity and user mood or emotional state.

6. The method of claim 5, said method further comprising the step of receiving user preferences relating to temporal preferences as to when the user wishes to received specified content.

7. The method of claim 6, said method further comprising the step of receiving user preferences relating to device preferences as to the computing devices on which the user wishes to receive the specified content.

8. The method of claim 7, said method further comprising the step of receiving user preferences relating to priority settings as to an order of how the user preferences are to be applied in presenting content to the user.

9. The method of claim 4, said method comprising the step of receiving user preferences relating to the type of content the user wishes to receive when the user is alone and the type of content the user wishes to receive when the user is not alone, the type of content depending on a composition of a group of users present when the user is not alone.

10. The method of claim 9, said method further comprising the step of receiving user preferences relating to a first group of one or more devices on which the user wishes to receive content when the user is alone and user preferences relating to a second group of one or more devices on which the user wishes to receive content when they are not alone.

11. In an environment including one or more computing devices, a computing device of the one or more computing devices coupled to a capture device for capturing image and audio data from a user, a method of customizing content for presentation to a user via one or more computing devices, comprising:
(a) detecting at least one of user identity and a user mood or emotion via at least one of a gesture recognition engine, a facial recognition engine, a body language recognition engine and a voice recognition engine;
(b) receiving user preferences as to the type of content a user wishes to receive, and user preferences as to how and when a user wishes to receive specified content, said step (b) including user preferences as to which content the user wishes to receive on which devices the user uses; and
(c) presenting content to the user based on said steps (a) and (b).

12. The method of claim 11, said step (a) of detecting at least one of user identity and a user mood or emotion comprising the step of detecting a visual indicator of identity, including at least one of physical appearance, facial features and voice pattern.

13. The method of claim 11, said step (a) of detecting at least one of user identity and a user mood or emotion further comprising the step of identifying a user by a mobile device carried with the user, the mobile device pairing with one or more of the computing devices of the computing environment to receive an identity of the owner of the mobile device carried by the user.

14. The method of claim 11, said step (a) of detecting at least one of user identity and a user mood or emotion comprising the step of detecting a visual indicator of mood or emotion, including at least one of facial features, body language, voice volume and voice intonation.

15. The method of claim 11, further comprising the step (d) of detecting attentiveness of the user to presented content via at least one of the gesture recognition engine, facial recognition engine, a body language recognition engine and a voice recognition engine.

16. The method of claim 15, said step (d) of detecting attentiveness of the user to presented content comprising the step of detecting a visual indicator of attentiveness, including at least one of facial features, body position relative to the source of content, and voice.

17. A computer-readable storage medium for programming a processor to perform a method of customizing content for presentation to a user via one or more computing devices, the method comprising:
(a) identifying
an emotional state or mood of one or more users within perception range of a computing device of the one or more computing devices via hand or arm gestures performed by the user;
(b) receiving user preferences of a user of the one or more users, the user preferences specifying:
(b1) the type of content the user wishes to receive,
(b2) times at which the user wishes to receive the content specified in step (b1), and
(b3) the computing devices on which the user wishes to receive the content specified in said step (b1); and
(c) customizing content presented to the user based on said steps (a) and (b).

18. The method of claim 17, the user comprising a first user, the method further comprising receiving at least one of the user preferences specified in steps (b1) to (b3) for a second user, the method further identifying a commonality shown in the user preferences for the first and second users when the first and second users are together, and the method further presenting content to the first and second users based on an identification of commonality shown in the user preferences for the first and second users.

19. The method of claim 18, the method further comprising the step of identifying a conflict in the content preferred by the first and second users, the method further comprising the step of resolving the conflict by settings in the user preferences of the first and/or second users or by prompting the first and second users to resolve the conflict.

20. The method of claim 17, comprising the steps of:
presenting a content to the user on a computing device when the user is alone, and changing at least one of the content presented to the user and the computing device on which the content is presented upon another user joining the user.

* * * * *